United States Patent

Aoyagi

[11] Patent Number: 5,147,702
[45] Date of Patent: Sep. 15, 1992

[54] SEAL

[76] Inventor: Juuro Aoyagi, 9-11, 3-chome, Hamadayama, Suginami-ku, Tokyo, Japan

[21] Appl. No.: 772,632

[22] Filed: Oct. 8, 1991

Related U.S. Application Data

[63] Continuation of Ser. No. 427,198, Oct. 26, 1989, abandoned.

[51] Int. Cl.⁵ ............................................. B32B 3/10
[52] U.S. Cl. .................................... 428/65; 277/227; 277/DIG. 6; 522/120; 522/153; 526/329; 526/331
[58] Field of Search .................. 277/DIG. 6, 227; 526/329, 331; 522/120, 153; 428/64, 65

[56] References Cited

U.S. PATENT DOCUMENTS

| | | | |
|---|---|---|---|
| 3,734,843 | 5/1973 | Tubbs | 522/153 |
| 3,882,005 | 5/1975 | Hoyt et al. | 522/153 |
| 3,892,884 | 7/1975 | Garratt et al. | 522/120 |
| 4,453,940 | 6/1984 | Aoyagi et al. | 522/153 |

FOREIGN PATENT DOCUMENTS

| | | | |
|---|---|---|---|
| 15137 | 5/1970 | Japan | 522/120 |
| 48-001823 | 1/1973 | Japan . | |
| 28055 | 2/1973 | Japan | 277/DIG. 6 |
| 18564 | 6/1973 | Japan | 522/120 |
| 56-088481 | 7/1981 | Japan . | |
| 62-036434 | 2/1987 | Japan . | |

*Primary Examiner*—Alexander S. Thomas
*Attorney, Agent, or Firm*—Mathews, Woodbridge & Collins

[57] ABSTRACT

A seal characterized by prossessing a cushioning part formed by cross-linking a copolymer of an α-olefin with a carboxylic acid-containing vinyl monomer owing to exposure to radiation or electron beam.

3 Claims, 3 Drawing Sheets

SEAL

This application is a continuation of Ser. No. 07/427,198 filed Oct. 26, 1989, now abandoned.

BACKGROUND OF THE INVENTION

1. Field of the Invention

This invention relates to seals. More particularly, this invention relates to seals formed of a novel raw material. Further, this invention relates to seals to be used in the place of asbestos gaskets or packings, for example. This invention also relates to seals such as O rings, packings, etc. disposed in joints of pipes or containers laid in plants of the food industry, for example.

2. Prior Art

Asbestos is an inexpensive material excellent in resistance to heat, resistance to chemicals, resistance to wear, and tensile strength and, moreover, the fibers of asbestos are very soft. Thus, the asbestos is used extensively in the field of seals as gaskets or packings.

The asbestos dust drifting in the air, when inhaled in a large amount over a long period by a person, he is liable eventually to suffer from impaired health due to asbestosis or cancer of the lung. In recent years, the hazard has been raising a social issue. This environmental problem brings its influence to bear on seals. Recently, efforts have been directed to the development of seals made of a raw material taking the place of asbestos.

The constituent materials currently used for seals in the place of asbestos include sheets of such general-purpose rubbers as styrene-butadiene rubber, acrylonitrilebutadiene rubber, butadiene rubber, and chloroprene rubber, sheets of urethane rubber, sheets of polytetrafluoroethylene, polytetrafluoroethylene-coated asbestos sheet, carbon fiber knit, and Alamides fiber knit, for example.

The seals made of general-purpose synthetic rubber sheets, among other materials mentined above, have an advantage that low pressure suffices for squeezing, satisfactory field workability is exhibited, a high contracting-resiling property is displayed, and an electric insulating property is manifested. They are, however, deficient in weatherability and in resistance to pressure. When these seals are applied to joints, for example, stainless steel or other similar metal forming the joints is corroded and suffered to sustain pinholes. The seals made of urethane rubber, similarly to those of general-purpose rubber sheets, have an advantage that low pressure suffices for squeezing, a high contracting-resiling property is displayed, an electric insulating property is manifested, and deformation occurs only slightly even under high pressure. They, however, are relatively expensive and are deficient in resistance to acids. The seals made of polytetrafluoroethylene sheet have an advantage that high resistance to chemicals and resistance to cold are exhibited and an electric insulating property is manifested. They however, possess poor elasticity, require high pressure for squeezing, and are expensive. The seals made of polytetrafluoroethylene-covered asbestos enjoy an excellent contracting-resiling property in addition to the advantage of the seals of polytetrafluoroethylene sheet mentioned above. They, however, are producible only in limited size and shape. Further, they prove to be disadvantageous because they inevitably incorporate therein asbestos, a substance those use is now enthusiastically discouraged by reason of danger to safety. The seals made of carbon fiber knit, though superior to asbestos in resistance to chemicals and softness, are inferior to asbestos in resistance to heat and are expensive. The seals made of Alamides fiber knit exhibit tensile strength and elasticity substantially equal to those of the seals of asbestos. They, however, are expensive.

Though various constituent materials for seals have been developed to take the place of asbestos, they are not fully satisfactory from the standpoint of performance of cost. In the circumstances, a desired is expressed in the industry to develop new raw materials.

Seals such as O rings and packings are disposed in joints of pipes or containers laid in plants of the food industry, for example. These seals are required not only to abound with such properties as tensile strength, elasticity, sealing property, and resistance to chemicals but also to warrant high safety with respect to exudates.

Heretofore, as the seals such as O rings and packings are disposed in joints of pipes or containers laid in plants of the food industry, for example, those made of such raw materials as general-purpose rubbers, urethane rubber, or silicone rubber have been generally used. The seals made of such raw materials as general-purpose rubbers or urethane rubber are not fully satisfactory, as described above, in such properties as tensile strength, elasticity, sealing property, and resistance to chemicals and, more often than not, they prove to be unsatisfactory in terms of the safety with respect to exudates. The seals made of silicone rubber, in contrast, exhibit strength, elasticity, sealing property, resistance to chemicals, and resistance to heat sufficiently and prove to be highly satisfactory in terms of the safety with respect to exudates in the application under discussion. Unfortunately, they are expensive. Thus, the desirability of developing seals which possess equal or more desirable properties and which are not expensive has been finding growing recognition.

SUMMARY OF THE INVENTION

An object of this invention, therefore, is to provide a novel seal. Another object of this invention is to provide a seal which excels in tensile strength, elasticity, sealing property, and resistance to chemicals and warrants improved environmental and physiological safety. Yet another object of this invention is to provide a seal which possesses outstanding properties and is inexpensive.

The objects described above are accomplished by a seal, characterized by possessing a cushioning part formed by cross-linking a copolymer of an $\alpha$-olefin with a carboxylic acid-containing vinyl monomer owing to exposure to radiation or electron beam. By the term "carboxylic acid-containing vinyl monomer" is meant a carboxylic acid ester containing vinyl unsaturation in either the acid or the alcohol portion of the ester.

In a preferred embodiment of this invention, the $\alpha$-olefin in the copolymer is an $\alpha$-olefin having two to five carbon atoms and the vinyl monomer containing a carboxylic acid is vinyl acetate. In another preferred embodiment of this invention, the $\alpha$-olefin in the copolymer is an $\alpha$-olefin having two to five carbon atoms and the vinyl monomer containing a carboxylic acid is an alkyl acrylate containing an alkyl group of 1 to 5 carbon atoms.

The seal of this invention, as clearly noted from the data obtained in the working examples cited hereinafter, possesses outstanding softness and elasticity and excels in a contracting-resiling property and, therefore, acquires a high sealing property with low squeezing pressure. It has no possibility of raising an environmental problem of the kind caused by asbestos. Since the copolymer mentioned above has been cross-linked in the absence of a cross-linking agent, the corrosion of stainless steel or other metal forming joints and the pollution of a fluid flowing through pipes which are caused by the cross-linking agent otherwise possibly remaining in the copolymer are never caused by the seal of this invention. The seal is also stable thermally. Since the seal is fully satisfactory in physical properties such as tensile strength, it enjoys perfect workability, excels in processability and dimensional stability, and proves to be useful in various applications as gaskets, packings, or O rings, for example.

DETAILED DESCRIPTION OF THE INVENTION

Now, this invention will be described more specifically below with reference to some embodiments.

The seal of this invention is characterized by possessing a cushioning part formed by cross-linking a copolymer of an α-olefin with a carboxylic acid-containing vinyl monomer owing to exposure to radiation or electron beam. The seal may be formed solely of the copolymer or may be formed by molding a cushioning part with the copolymer and furnishing the cushoning part with a metallic jacket, for example.

The copolymer of an α-olefin with a carboxylic acid-containing vinyl monomer obtained by cross-linking due to exposure to radiation or electron beam and used for the seal of this invention is produced by a method which comprises preliminarily or completely molding in a desired shape a copolymer of an α-olefin with a caboxylic acid-containing vinyl monomer by a desired molding process such as, for example, injection molding or calender molding, then exposing the resultant shaped mass to radiation or electron beam thereby inducing cross-linking in the copolymer, and optionally subjecting the shaped mass to such secondary fabrication as cutting or severing.

The copolymer of an α-olefin with a carboxylic acid-containing vinyl monomer to be used in the production of the seal of this invention is widely variable. Typically, α-olefin-vinyl acetate copolymers possessing the following repeating unit:

(wherein R¹ stands for a hydrogen atom or an alkyl group and n for a number satisfying the expression, $0<n<1$) and α-olefin-alkyl acrylate copolymers possessing the following repeating unit:

(wherein R¹ stands for a hydrogen atom or an alkyl group, R² for an alkyl group, and n for a number satisfying the expression, $0<n<1$) may be cited.

The copolymer of an α-olefin with a carboxylic acid-containing vinyl monomer is desired to be such that the α-olefin is an α-olefin of two to five carbon atoms, i.e. the substituent, R¹, in the aforementioned repeating unit is a hydrogen atom or an alkyl group of one to three carbon atoms. Where the copolymer of an α-olefin with a carboxylic acid-containing vinyl monomer is an α-olefin-alkyl acrylate copolymer mentioned above, the substituent, R² in the aforementioned repeating unit is desired to be an alkyl group of one to five carbon atoms, particularly two to four carbon atoms. When the monomers constituting the copolymer fulfil these conditions, the seal produced with the copolymer excel in resistance to chemicals, elasticity, and softness more than the seal produced with a copolymer using other monomers not fulfilling the conditions.

In the copolymer of an α-olefin with a carboxylic acid-containing vinyl monomer, the contents of the α-olefin and the carboxylic acid-containing vinyl monomer are desired to be such that the content of the α-olefin is in the range of 98 to 60 mol %, preferably 97 to 65 mol % and the content of the carboxylic acid-containing vinyl monomer in the range of 2 to 40 mol %, preferably 3 to 35 mol %. In the case of the α-olefin-vinyl acetate copolymer and the α-olefin-alkyl acrylate copolymer mentioned above, therefore, the subscript, n, representing the number of repeating unit is in the range of 0.02 to 0.40, preferably 0.03 to 0.35. If the content of an α-olefin exceeds 98 mol %, the copolymer has an unduly high crystallization degree and is deficient in elasticity and softness. Conversely, if the content of the α-olefin is less than 60 mol %, the copolymer is deficient in tensile strength and compacting-resiling property. In the case of an α-olefin-vinyl acetate copolymer, if the content of the vinyl acetate is in the range 10 to 10 mol %, the copolymer is colorless and semitransparent. If the content exceeds 18 mol %, the copolymer is transparent.

Optionally, the copolymer of an α-olefin with a carboxylic acid-containing vinyl monomer may, as occasion demands, incorporate therein such additives as coloring agent, stabilizing agent, filler, and antistatic agent.

The copolymer of an α-olefin with a carboxylic acid-containing vinyl monomer is cross-linked by exposure to radiation or electron beam. Since, the cross-linking of the copolymer constituting the seal of this invention is effected in the absence of a cross-linking agent, the corrosion of stainless steel or other metal forming joints and the pollution of a fluid flowing through pipes which are caused by the cross-linking agent otherwise possibly remaining in the copolymer are never caused by the seal of this invention. The seal is also stable thermally. For the irradiation intended to induce the cross-linking, it is desirable to use γ ray or electron beam, preferably the γ ray. When the cross-linking is effected by the use of the γ ray, for example, the dosage is desired to be approximately in the range of 1 to 25 Mrads, preferably 8 to 15 Mrads.

For the copolymer of an α-olefin with a carboxylic acid-containing vinyl monomer which has been cross-linked by exposure to radiation or electron beam, the cross-linking degree is not specifically defined. For the produced seal to acquire sufficient elasticity and softness and manifest highly desirable contracting-resiling property and thermal stability, the cross-linking degree of the copolymer is desired to be approximately in the range of 30 to 95, preferably 60 to 90. When the cross-linking degree is 70 or over, the copolymer acquires high resistance to heat. Specifically, in the case of an ethylene-vinyl acetate copolymer, the high resistance to heat which is imparted to the copolymer is such that the copolymer can resist heat even exceeding a temperature of 120° C. When the cross-linking degree is in the range of 30 to 70, the copolymer acquires highly desirable low-temperature resistance, though a slight sacrifice of heat resistance to heat. To be specific, in the case of an ethylene-vinyl acetate copolymer, the low-temperature resistance is such that the copolymer acquires an ability to resist cold to a temperature of −120° C.

The seal of this invention, as described above, is formed of the copolymer of an α-olefin with a carboxylic acid-containing vinyl monomer which has been cross-linked by exposure to radiation or electron beam. Owing to its outstanding characteristic properties, this seal can be used in various applications as gaskets, packings, or O-ring. It exhibits an extremely find sealing property under conditions wherein the working temperature is in the range of −90° to 100° C. and the maximum working pressure is 30 m kg/cm².

Figure 1:
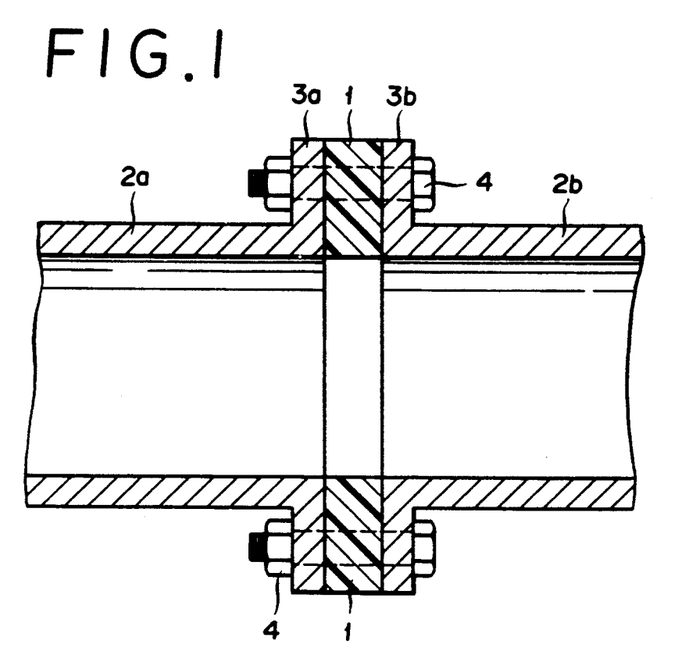
FIG. 1 is a cross section illustrating the state in which a typical seal as one embodiment of this invention is used.

FIG. 1 is a diagram illustrating a gasket for a water pipe as one embodiment of the seal of this invention. In this embodiment, a gasket 1 formed solely of the copolymer mentioned above is interposed fast between flange parts 3a, 3b of water pipes 2a, 2b each possessing a length in the range of 3 to 4 m and tightened up with a pressure of about 0.2 kg/mm² by bolt-nut pairs 4. Inside the water pipes 2a, 2b, water is forwarded with a pressure of about 10 atmospheres at temperatures in the range of 10° to 27° C. The gasket 1 formed of the copolymer retains the sealing property stably for a long time without causing any pollution of the water being passed therein or any corrosion on the flange parts 3a, 3b of the water pipes 2a, 2b.

Figure 2:
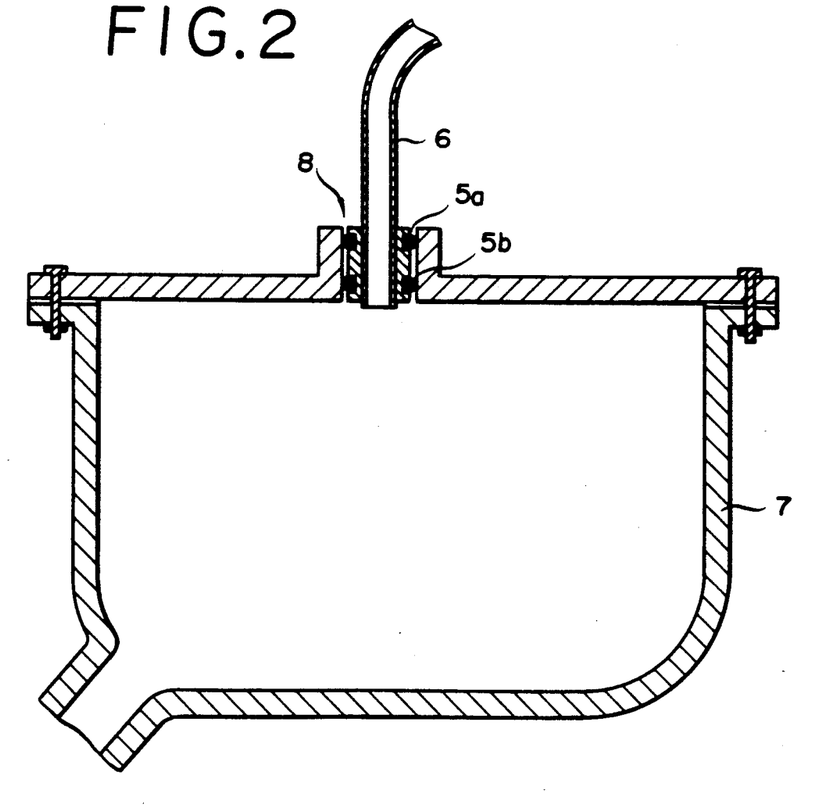
FIG. 2 is a cross section illustrating the state in which another typical seal as another embodiment of this invention is used.

FIG. 2 is a diagram illustrating the condition of use in a pressure container for food processing of an O ring as another embodiment of this invention. In this embodiment O ring 5a, 5b formed solely of the aforementioned copolymer are disposed around the peripheral surface of the leading end part of a feed liquid inlet pipe 6 so that the O rings will be pressed against the inner wall surface of an opening 8 of a pressed container when the leading end part of the inlet pipe 6 is inserted into the opening 8. During the use of this pressure container 5, the interior of this pressure container is placed under the conditions of a temperature in the range of −40° to 70° C. and a pressure of about 20 atmospheres. The O rings 5a, 5b formed of the aforementioned copolymer can retain its sealing property stably for a long time without inducing exudation of harmful substance into the feed liquid being processed in the pressure container 7 or being passed through the inlet pipe 6.

EXAMPLES

Now, the present invention will be described more specifically below with reference to working examples. It should be noted, however, that the following working examples are cited purely for the purpose of illustration of this invention. The scope of this invention is not limited in any sense to the procedures and compositions described in the working examples.

A sheet 2 mm in thickness was produced with an ethylene-vinyl acetate copolymer (vinyl acetate content 8% by weight, viscosity [n]=0.85 in benzene at 30° C.). Then, the ethylene-vinyl acetate copolymer in the sheet was cross-linked by exposing this sheet to 10 Mrads of γ ray. A gasket was produced by punching this sheet in a required shape.

The gasket thus obtained was tested for evaluation of its quality as follows.
1. Test for quality
The test was performed with respect to various qualities as enumerated below. The results are shown in Table 1.
1) Specific gravity
   This quality was tested in accordance with Japanese Industrial Standard (JIS) K7112.
2) Hardness
   This quality was tested in accordance with JIS K6301.
3) Tensile strength
   This quality was tested in accordance with JIS K7113.
4) Specific heat
   Instrument: Product of Mettler Corp, TA-3000, DSC-30
   Temperature increasing rate: 10° C./min.
   Atmosphere: 40 ml/min, in N.
5) Test for thermal conductivity
   Shibayama's acetone-benzene process (temperature −68.4° C.)
6) Test for thermal inflation
   Instrument: Product of Mettler Corp, TA-3000, TMA-40
   Temperature increasing rate: 10° C./min
   Load: 0.02N
   Atmosphere: 40 ml/min, in N.
7) Test for Vicat softening temperatue
   This quality was tested in accordance with JIS K7206.
8) Test for volume resistivity
   This quality was tested in accordance with JIS K6911.
9) Test for dielectric constant and dielectric loss tangent
   These qualities were tested in accordance with JIS K6911.
10) Test for Test for dielectric breakdown
    This quality was tested in accordance with JIS K6911.
11) Test for arc-resisting property
    This quality was tested in accordance with JIS K6911.
12) Test for water-absorbing rate
    This quality was tested in accordance with JIS K6911. This test was performed at 25°±1° C. for 24 hours.
13) Test for resistance to acids
    In accordance with JIS K7114, this quality was tested by immersing samples in sulfuric acid (10 w/w % and 30 w/w %) and hydrochloric acid (10 w/w % and 35 w/w %) at normal room temperature for seven days and, at the end of the immersion, examining the samples with respect to change in mass and outward appearance.

14) Test for resistance to alkalis

In accordance with JIS K7114, this quality was tested by immersing samples in sodium hydroxide (10 w/w % and 30 w/w %) at normal room temperature for seven days and, at the end of the immersion, examining the samples with respect to change in mass and outward appearance.

15) Test for resistance to organic solvents

In accordance with JIS K7114, this quality was tested by immersing samples in ethyl alcohol and carbon tetrachloride at normal room temperature for seven days and, at the end of the immersion, examining the samples with respect to change in mass and outward appearance.

16) Test for weatherability

This quality was tested in accordance with JIS D0205 with the aid of a Sunshine weather meter under the following conditions.

Black panel temperature: 63°±3° C.
Rainfall cycle: 18 minutes/120 minutes
Average discharge voltage: 50 V
Average discharge current: 60 A
Testing time: 120 hours 2. Test for outward appearance This test was performed by the standard for the evaluation of outward appearance of rubber for water pipe, with necessary modifications. The results are shown in Table 2.

3. Test for size (designated by Japan Waterworks Association)

This test was performed with respect to size of sheet of packing and allowance of the size as follows.
1) Allowance for inside and outside diameters
2) Allowance for thickness The results are shown in Table 3.

4. Test for exudate

The test was performed with respect to various items in dicated below, in accordance with the pharmacopoeial method for testing plastic containers for transfusion liquids. The results are shown in Table 4.

Portions uniform in thickness were cut off a sample to secure pieces whose obverse and reverse areas totalled 1,200 cm$^2$. These pieces were further cut into strips measuring about 5 cm in length and about 0.5 cm in width, washed with water, and dried at normal room temperature. The cleaned strips were placed in a glass container having an inner volume of about 300 ml and conforming to the standard for the test of injection grade glass container for alkali exudate, covered with 200 ml of water added thereto sealed hermetically in the container, heated at 121° C. for an hour by the use of a high-pressure steam sterilizer, and left standing and cooling off to normal room temperature. The liquid consequently obtained was used as a testing solution. Separately, a blank test solution was prepared by repeating the procedure described above on plain water. The testing solution and the blank test solution were tested with respect to the following qualities.

1) Attribute

A 50-ml sample was placed in a Nessler's tube and observed visually against a black and a white background.

2) Foaming

This quality was tested by placing a 5-ml testing solution in a test tube measuring about 15 mm in inside diameter and about 200 mm in length and fitted with a ground stopper, vigorously shaken therein for three minutes, and clocking the time required for the produced foam to disappear virtually completely by the use of a stopwatch.

3) pH This quality was tested by securing 20-ml samples each of the testing solution and the blank test solution, adding 1.0 ml each of a solution prepared by dissolving 10 g of potassium chloride to a total volume of 1,000 ml to the samples, measuring the pH values of the resultant solutions, and calculating the difference between the two pH values consequently obtained.

For the measurement of pH, a pH meter produced by Hitachi-Horiba K.K. and marketed under product code of "F-7" was used.

4) Chloride

This test was performed by following the procedure of the testing solution 1. The test solution for comparison involved addition of 0.2 ml of 0.001N hydrochloric acid.

5) Sulfate

This test was performed by placing a 20-ml sample of the testing solution in a Nessler's tube and then following the procedure prescribed for the sulfate test. The test solution for comparison involved addition of 0.2 ml of 0.001N hydrochloric acid.

6) Phosphate

This test was performed by placing a 50-ml sample of the testing solution in a Nessler's tube, thoroughly shaking the sample with 2.5 ml of ammonium molybdenum-sulfate test solution and 1.0 ml of 1-amino-2-naphthol-4-sulfonic acid test solution to the sample, added thereto, and comparing the color of the resultant solution with that of the following comparison solution.

Comparison solution: A solution obtained by diluting 0.30 ml of a standard phosphoric acid solution used in the place of the testing solution with 50 ml of water was subjected to the same procedure as described above.

7) Ammonium

This test was performed by placing a 10-ml sample of the testing solution in a Nessler's tube, diluting the same with water to a total volume of 50 ml, thoroughly shaking the diluted sample with 2.0 ml of an aqueous sodium hydroxide solution (1→3) 1.0 ml of Nessler's reagent added thereto, and comparing the color of the resultant solution with the color of the following comparison solution.

Comparison solution: A 10-ml sample of the blank test solution was placed in a Nessler's tube and subjected to the same procedure as described above.

8) Lead

The testing solution was used as a sample solution. Separately, a solution obtained by diluting 0.5 ml of the standard lead solution accurately to a total volume of 50 ml by the addition of the blank test solution was used as the standard solution. The testing solution and the standard solution were tested by the atomic absorptiometry under the following conditions and the absorbancy of the testing solution was compared with that of the standard solution.

Instrument: Atomic absorptiometer produced by Hitachi Co., Ltd. and marketed under product code of "170-10"
Gases used: Inflammable gas—Acetylene Combustion-supporting gas—Air
Lamp: Led hollow cathode lamp
Wavelength: 283.3 nm 9) Cadmium A sample solution was prepared by adding 10 ml of ammonium citrate solution (1→4) and two drops of bromothymol blue reagent to 10 ml of the testing solution, adding ammonium reagent to the resultant mixture until the mixture's color turned from yellow to green, adding to the mixture 10 ml of ammonium sulfate solution (2→5) and water until a total volume of 100 ml, then intimately mixing the diluted mixture with 20 ml of sodium diethyldithiocarbamate solution (1→20), allowing the resultant mixture to stand at rest for several minutes, then vigorously shaking the mixture with 200 ml of methylisobutylketone, and allowing the resultant mixture to stand at rest to induce separation of a methylisobutyl ketone layer (sample solution). Separately, a standard solution was prepared by securing 0.5 ml of standard cadmium solution, adding thereto 10 ml of the blank test solution, 10 ml of an ammonium citrate solution (1→4), and two drops of bromothymol blue reagent, and then treating the resultant mixture in the same manner as the sample solution. The sample solution and the standard solution were tested by the atomic absorptiometry under the following conditions and the absorbancy of the sample solution was compared with that of the standard solution.

Instrument: Atomic absorptiometer produced by Hitachi Co., Ltd. and marketed under product code of "170-10"
Gases used: Inflammable gas—Acetylene Combustion-supporting gas—Air
Lamp: Cadmium hollow cathode lamp
Wavelength: 228.8 nm 10) Zinc A sample solution was prepared by diluting 10 ml of the testing solution with dilute nitric acid (1→3) to a total volume of 20 ml. Separately, standard solutions were prepared by diluting 1.0 ml of the standard zinc solution for atomic absorptiometry accurately to a total volume of 10 ml by the addition of water, securing 1.0-ml, 0.5-ml, and 0.1-ml portions of the diluted solution a and diluting these portions each to a final volume of 20 ml by the addition of dilute nitric acid solution (1→3). The sample solution and the standard solutions were tested by the atomic absorptiometry under the following conditions and the absorbancy of the sample solution was compared with the absrobancies of the standard solutions.

Instrument: Atomic absorptiometer produced by Hitachi Co., Ltd. and marketed under product code of "170-10"
Gases used: Inflammable gas—Acetylene Combustion-supporting gas—Air
Lamp: Zinc hollow cathode lamp
Wavelength: 213.9 nm 11) Potassium permanganate-reducing substance This test was performed by placing a 20-ml sample of the testing solution in an Erlenmeyer flask fitted with a ground stopper, boiling the sample with 20 ml of 0.01N potassium permanganese and 1.0 ml of dilute sulfuric acid added thereto for three minutes, cooling the boiled solution, adding 0.10 g of potassium iodide to the resultant mixture, hermetically sealing the container, shaking the contents of the flask, allowing the shaken contents to stand at rest for 10 minutes, and then titrating the produced solution with 0.01N sodium thiosulfate solution (with 5 drops of starch reagent as an indicator). Separately a 20-ml sample of the blank test solution was similarly treated to find the difference in the amount of the 0.01N potassium permanganate solution consumed.

12) Distillation residue

This test was performed by evaporating a 20-ml sample of the testing solution to dryness over a water bath, drying the residue at 105° C. for one hour, and weighing the residue of evaporation.

13) Ultraviolet absorption spectrum

The testing solution, with the blank test solution as a control, was tested for absorbancy in a wavelength zone of 220 nm to 350 nm with a layer length of 10 mm.

As the ingtrument for the test, a double-beam spectrophotometer produced by Shimazu Seisakusho Co., Ltd. and marketed under product code of "UV-300" was used.

5. Test for cytotoxicity

The extract of the sample was prepared by securing a portion of the sample having a total area of 60 $cm^2$ on the obverse and reverse surfaces and heating this portion with 20 ml of injection quality distilled water at 121° C. for one hour. The test described below was performed within 24 hours of the extraction.

First, a cell suspension was prepared by propagating murine fibroblasts (L-929) in a fermentation vial having an inner volume of about 1 liter and containing Eagle medium until the cells formed a monolayer film and further suspending the cells in the Eagle medium so that the cell concentration after the treatment with trypsin reached 10 cells per ml.

Then an extract-treated medium was obtained by mixing the extract with an equal volume of Eagle medium twice as high in concentration. Separately, a control medium was prepared by mixing injection grade distilled water with an equal volume of Eagle medium twice as high in concentration.

In 15 test tubes, 0.2-ml samples of the cell suspension ($2 \times 10^5$ cells) were dispensed. To five of these samples (treated group), 2 ml each of the extract-treated medium was added. To the remaining 10 samples (control group at the start of reaction and the 72-hour control group), 2 ml each of the control medium was added.

Five of the test tubes containing samples involving addition of the control medium were immediately centrifuged to separate the medium. The cells consequently separated were suspended again in a solution of phosphate buffer in physiological saline solution of pH 7.0. These suspensions were again centrifuged twice to wash out cells. The residues were preserved at 4° C. to be used as samples of the control group at the start of reaction.

The 10 test tubes of the treated group and the 72-hour control group were immediately fermented within a 5% carbon dioxide gas fermentation device at 37° C. for 72 hours. After the fermentation, the fermented samples were gently three times with about 2 ml of a solution of phosphate buffer in physiological saline solution at pH 7.0. The samples were used as the treated group and the 72-hour control group.

The contents of the test tubes of the groups were assayed for total protein content by colorimetry (Lowry process). The contents of the test tubes were tested for absorbancy (O.D,) at 650 nm to determine average O.D. of five samples of each group. The cell growth inhibition ratio was calculated in accordance with the following formula.

Cell growth inhibition ratio (%) =

$$\left[1 - \frac{(O.D. \text{ of 72-hour treated tubes}) - (O.D. \text{ of control test tubes at start of reaction})}{(O.D. \text{ of 72-hour control} -) - (O.D. \text{ of control})}\right] \times 100$$

The results are shown in Table 5.

6. Pressure test

1) Air-tightness test

Figure 3:
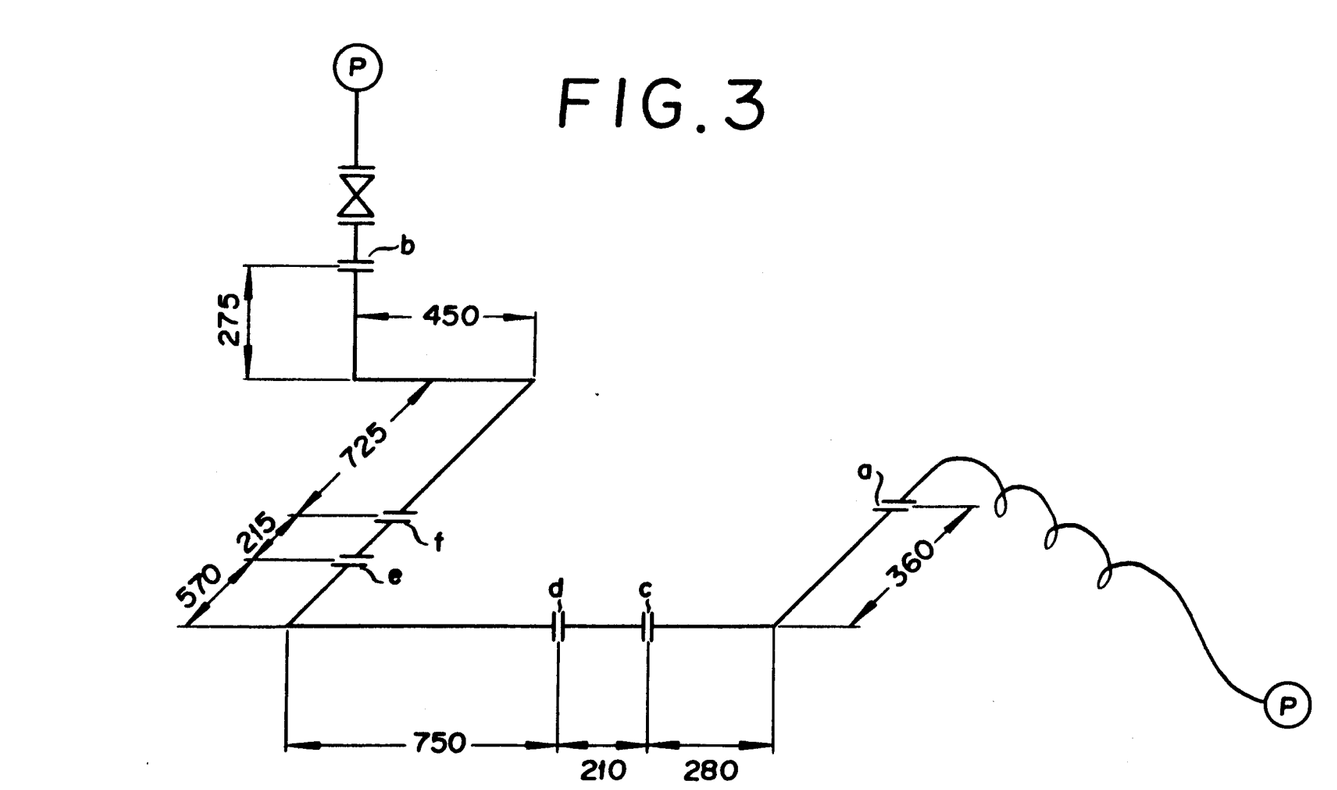
FIG. 3 is a schematic diagram illustrating a piping condition to be used in a pressure test.
Figure 4:
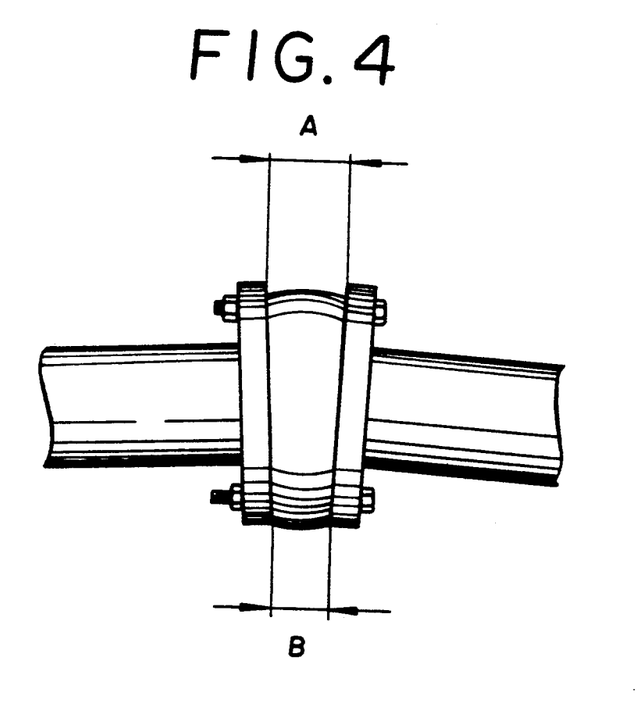
FIG. 4 is a model diagram illustrating the state in a one-sided squeezing test.

This test was performed in a piping illustrated in FIG. 3 by disposing gaskets one each at a plurality of joints (loose flanges), c to f, of steel pipes, squeezing the gaskets with a pressure of about 0.2 kg/mm², passing water or air under varying pressure conditions through the pipes over a period of 100 hours, and determining the airtightness of the gaskets. The results are shown in Table 6.

2) Single-sided squeezing test

This test was performed by disposing a gasket at a joint of a pipe in such a manner that the force of squeezing was exerted on only one side (B part) as illustrated in FIG. 5 and a clear difference of squeezing occured relative to the opposite side (A part), and determining the retention of airtightness by passing air under a pressure of 10 kg/cm² through the pipe. The results are shown in Table 6.

TABLE 1

Results of test for quality

| | | | | | | | | | | |
|---|---|---|---|---|---|---|---|---|---|---|
| Specific gravity | | | | | 0.94 | | | | | |
| Hardness Hs(JIS A) | | | | | 91 | | | | | |
| Tensile test | | | | | | | | | | |
| Tensile strength (kgf/cm²) | | | | | 154 | | | | | |
| Elongnation (%) | | | | | 470 | | | | | |
| Test for specific heat | | | | Sample temperature (°C.) | | | | | | |
| | 20 | 30 | 40 | 50 | 60 | 70 | 80 | 90 | 100 | 110 |
| Specific heat (J/g °C.) | 2.18 | 2.28 | 2.62 | 3.20 | 3.24 | 3.29 | 4.68 | 2.39 | 2.22 | 2.25 |
| Thermal conductivity (Kcal/m.h. °C.) | | | | | 0.12 | | | | | |
| Test for thermal expanison | | | | Temperature (°C.) | | | | | | |
| Thermal expansion ($10^{-6}$/°C.) | 40~50 287.4 | | 40~60 324.1 | | 40~70 389.9 | | 40~80 486.8 | | 40~90 643.2 | 40~100 610.9 |
| Vicat softening temperature (°C.) | | | | | 62.5 | | | | | |
| Volum resistivity (Ω.cm) | | | | | $3.1 \times 10^{15}$ | | | | | |
| Dielectric constant and | | | | | Frequency (Hz) | | | | | |
| dielectric loss tangent | $5 \times 10$ | $1.1 \times 10^2$ | $3.3 \times 10^2$ | $1 \times 10^3$ | $3 \times 10^4$ | $1 \times 10^4$ | $3 \times 10^4$ | $1 \times 10^5$ | $3 \times 10^5$ | $1 \times 10^6$ |
| Dielectric constant | 3.15 | 3.14 | 3.13 | 3.13 | 3.11 | 3.10 | 3.07 | 3.04 | 2.99 | 2.91 |
| Dielectric loss tangent ($\times 10^{-4}$) | 55 | 27 | 37 | 48 | 63 | 93 | 138 | 210 | 285 | 420 |
| Intensity of dielectric breakdown (KV/mm) | | | | | 32.4 | | | | | |
| Arc-resisting time (sec) | | | | 323 (Arc extinguished after fusion and ignition of sample) | | | | | | |
| Water absorption ratio (%) | | | | | 0 | | | | | |
| Test for resistance to acids | | | | Immersion time (hrs) | | | | | | |
| | 24 | 48 | 72 | 96 | 120 | 144 | | 168 | Appearance | |
| Ratio of change in mass (%) | | | | | | | | | | |
| 10% H₂SO₄ | 0 | | | | 0 | 0 | | 0 | nothing unusual | |
| 30% H₂SO₄ | 0 | | | | 0 | 0 | | 0 | nothing unusual | |
| 10% HCl | +0.1 | +0.1 | +0.1 | +0.1 | | | | +0.1 | nothing unusual | |
| 35% HCl | +0.8 | +0.8 | +0.9 | +0.9 | | | | +0.9 | nothing unusual | |
| Test for resistance to alkalis | | | | Immersion time (hrs) | | | | | | |
| | | 24 | | 120 | | 144 | | 168 | Appearance | |
| Ratio of change in mass (%) | | | | | | | | | | |
| 10% Na OH | | +0.1 | | +0.1 | | +0.1 | | +0.1 | nothing unusual | |
| 30% Na OH | | 0 | | 0 | | +0.1 | | +0.1 | nothing unusual | |
| Test for resistance to | | | | Immersion time (hrs) | | | | | | |
| organic solvents | | 24 | 72 | 96 | 120 | 144 | | 168 | Appearance | |
| Ratio of change in mass (%) | | | | | | | | | | |
| Ethyl alcohol | | +2.2 | +3.4 | +3.8 | +4.0 | +4.1 | | +4.2 | nothing unusual | |
| Carbon tetracarbon | | +313.1 | +391.0 | +404.0 | — | — | | — | remarkable softening | |
| Test for weatherability | | | | | | | | | | |
| Appearance | | | | No sign of discoloration, cracking, or fracture recognized | | | | | | |
| Tensile strength (kgf/cm²) | | | | | 86 123 | | | | | |
| Elongation (%) | | | | | 490 | | | | | |

TABLE 2

Results of test for appearance

| Designation of quality | Result | Rating |
|---|---|---|
| Porosity (sponge) | None | Acceptable |
| Lack of homogeneity | None | Acceptable |
| Uneven color | None | Acceptable |
| Foaming | None | Acceptable |
| Foreign matter (impurities) | None | Acceptable |
| Sinew | None | Acceptable |
| Irregularities | None | Acceptable |

TABLE 2-continued

Results of test for appearance

| Designation of quality | Result | Rating |
|---|---|---|
| Rough skin | None | Acceptable |
| Scratch | None | Acceptable |
| Poor finish | None | Acceptable |
| Sunken rubber | — | — |
| Gushing | — | — |
| Imperfect adhesion (crack) | — | — |
| Mismatch | None | Acceptable |
| Entrapped air | — | — |

TABLE 3

Allowances for inside and outside diameters and thickness

| Nominal diameter (mm) | Allowances | | |
|---|---|---|---|
| | Inside diameter (mm) | Outside diameter (mm) | Thickness (mm) |
| 75~900 | +2.0-0 | +0-2.0 | +0.5-0.3 |
| 1000~1500 | +3.0-0 | +0-3.0 | +0.5-0.4 |

Note) A steel tape, a micrometer, and calipers were used for the measurement of sizes.

TABLE 4

Results of test for exudates

| Test item | Sheet lot | Sample No. | Result | | | | |
|---|---|---|---|---|---|---|---|
| 1) Attribute | A | 1 | clolorless and transparent | | | | |
| | | 2 | clolorless and transparent | | | | |
| | | 3 | clolorless and transparent | | | | |
| | B | 1 | clolorless and transparent | | | | |
| | | 2 | clolorless and transparent | | | | |
| | | 3 | clolorless and transparent | | | | |
| | C | 1 | clolorless and transparent | | | | |
| | | 2 | clolorless and transparent | | | | |
| | | 3 | clolorless and transparent | | | | |
| 2) Foaming | A | 1 | 49 min. | | | | |
| | | 2 | 54 min. | | | | |
| | | 3 | 43 min. | | | | |
| | B | 1 | 66 min. | | | | |
| | | 2 | 50 min. | | | | |
| | | 3 | 51 min. | | | | |
| | C | 1 | 39 min. | | | | |
| | | 2 | 42 min. | | | | |
| | | 3 | 47 min. | | | | |
| 3) pH | A | 1 | sample solution | 5.55 | blank test solution | difference | 0.30 |
| | | 2 | | 5.52 | 5.85 | 0.33 | |
| | | 3 | | 5.50 | | | 0.35 |
| | B | 1 | | 5.63 | | | 0.25 |
| | | 2 | | 5.57 | 5.88 | | 0.31 |
| | | 3 | | 5.58 | | | 0.30 |
| | C | 1 | | 5.61 | | | 0.30 |
| | | 2 | | 5.66 | 5.91 | | 0.25 |
| | | 3 | | 5.62 | | | 0.29 |
| 4) Chloride | A | 1 | less than comparison solution | | | | |
| | | 2 | less than comparison solution | | | | |
| | | 3 | less than comparison solution | | | | |
| | B | 1 | less than comparison solution | | | | |
| | | 2 | less than comparison solution | | | | |
| | | 3 | less than comparison solution | | | | |
| | C | 1 | less than comparison solution | | | | |
| | | 2 | less than comparison solution | | | | |
| | | 3 | less than comparison solution | | | | |
| 5) Sulfate | A | 1 | less than comparison solution | | | | |
| | | 2 | less than comparison solution | | | | |
| | | 3 | less than comparison solution | | | | |
| | B | 1 | less than comparison solution | | | | |
| | | 2 | less than comparison solution | | | | |
| | | 3 | less than comparison solution | | | | |
| 6) Phosphate | A | 1 | less than comparison solution | | | | |
| | | 2 | less than comparison solution | | | | |
| | | 3 | less than comparison solution | | | | |
| | B | 1 | less than comparison solution | | | | |
| | | 2 | less than comparison solution | | | | |
| | | 3 | less than comparison solution | | | | |
| | C | 1 | less than comparison solution | | | | |
| | | 2 | less than comparison solution | | | | |
| | | 3 | less than comparison solution | | | | |
| 7) Ammonium | A | 1 | less than comparison solution | | | | |
| | | 2 | less than comparison solution | | | | |
| | | 3 | less than comparison solution | | | | |
| | B | 1 | less than comparison solution | | | | |
| | | 2 | less than comparison solution | | | | |
| | | 3 | less than comparison solution | | | | |
| | C | 1 | less than comparison solution | | | | |
| | | 2 | less than comparison solution | | | | |
| | | 3 | less than comparison solution | | | | |
| 8) Lead | A | 1 | not detect | | | | |
| | | 2 | not detect | | | | |
| | | 3 | not detect | | | | |
| | B | 1 | not detect | | | | |
| | | 2 | not detect | | | | |

TABLE 4-continued

Results of test for exudates

| Test item | Sheet lot | Sample No. | Result | | | | | |
|---|---|---|---|---|---|---|---|---|
| | | 3 | not detect | | | | | |
| | C | 1 | not detect | | | | | |
| | | 2 | not detect | | | | | |
| | | 3 | not detect | | | | | |
| 9) Cadmium | A | 1 | not detect | | | | | |
| | | 2 | not detect | | | | | |
| | | 3 | not detect | | | | | |
| | B | 1 | not detect | | | | | |
| | | 2 | not detect | | | | | |
| | | 3 | not detect | | | | | |
| | C | 1 | not detect | | | | | |
| | | 2 | not detect | | | | | |
| | | 3 | not detect | | | | | |
| 10) Zinc | A | 1 | same as blank | | | | | |
| | | 2 | same as blank | | | | | |
| | | 3 | same as blank | | | | | |
| | B | 1 | not detect | | | | | |
| | | 2 | not detect | | | | | |
| | | 3 | not detect | | | | | |
| | C | 1 | same as blank | | | | | |
| | | 2 | same as blank | | | | | |
| | | 3 | same as blank | | | | | |
| 11) Potassium permanganate-reducing substance | A | 1 | sample solution | 17.17 ml | blank test solution | | difference | 0.28 ml |
| | | 2 | | 17.23 ml | | 17.45 ml | | 0.22 ml |
| | | 3 | | 17.28 ml | | | | 0.17 ml |
| | B | 1 | | 17.24 ml | | | | 0.28 ml |
| | | 2 | | 17.27 ml | | 17.52 ml | | 0.25 ml |
| | | 3 | | 17.30 ml | | | | 0.22 ml |
| | C | 1 | | 17.31 ml | | | | 0.15 ml |
| | | 2 | | 17.24 ml | | 17.46 ml | | 0.22 ml |
| | | 3 | | 17.15 ml | | | | 0.31 ml |
| 12) Distillation residue | A | 1 | 0.2 mg | | | | | |
| | | 2 | 0.0 mg | | | | | |
| | | 3 | 0.0 mg | | | | | |
| | B | 1 | −0.1 mg | | | | | |
| | | 2 | 0.0 mg | | | | | |
| | | 3 | 0.4 mg | | | | | |
| | C | 1 | −0.2 mg | | | | | |
| | | 2 | 0.1 mg | | | | | |
| | | 3 | 0.0 mg | | | | | |
| 13) Ultraviolet absorption spectrum | A | 1 | 220~241 nm | 0.024 | 241~350 nm | | | 0.013 |
| | | 2 | | 0.023 | | | | 0.012 |
| | | 3 | | 0.023 | | | | 0.012 |
| | B | 1 | | 0.027 | | | | 0.013 |
| | | 2 | | 0.032 | | | | 0.018 |
| | | 3 | | 0.026 | | | | 0.014 |
| | C | 1 | | 0.035 | | | | 0.020 |
| | | 2 | | 0.026 | | | | 0.014 |
| | | 3 | | 0.019 | | | | 0.010 |

TABLE 5

Result of test for cytotoxicity

| O.D. of control test tube at start of test | O.D. of 72-hour control test tubes | O.D. of 72-hour treated test tubes |
|---|---|---|
| | 0.62 | 0.59 |
| | 0.62 | 0.60 |
| 0.25 | 0.61 | 0.59 |
| | 0.60 | 0.57 |
| | 0.62 | 0.62 |
| | 0.61 | 0.59 |
| Average value | 0.61 | 0.59 |

Cell propagation inhibition ratio (%) = 6

TABLE 6

Results of test for pressing

1) Test for airtightness

| Water pressure (kg/cm$^2$) | Airtightness |
|---|---|
| 10 | good |
| 15 | good |
| 20 | good |
| 25 | good |
| 30 | good |
| 35 | good |
| 40 | good |

| Air pressure (kg/cm$^2$) | |
|---|---|
| 10 | good |
| 20 | good |

2) One-sided squeezing (air pressure 10 kg/cm$^2$)

| A part (mm) | B part (mm) | A-B (mm) | Airtightness |
|---|---|---|---|
| 8 | 6 | 2 | good |
| 9 | 5 | 4 | good |

It should also be understood that the foregoing relates to only the scope of the invention is defined by the appended claims rather than by the description preceding them, and all changes that fall within meets and bounds of the claims, or equivalence of such meets and bounds are therefore intended to embraced by the claims.

I claim:

1. An annular seal comprising a co-polymer cross-linked by ionizing radiation and free of chemical cross-linking agents, said copolymer being obtained from
 (i) 60 to 98 mol % of an unsubstituted Á-olefin of 2 to 5 carbon atoms and
 (ii) 2 to 40 mol % of a carboxylic acid ester containing vinyl unsaturation in either the acid or the alcohol portion of said ester.

2. The seal as recited in claim 1 wherein the seal is an O-ring.

3. The seal as recited in claim 1 wherein the seal is a gasket.

* * * * *